Figure 1:
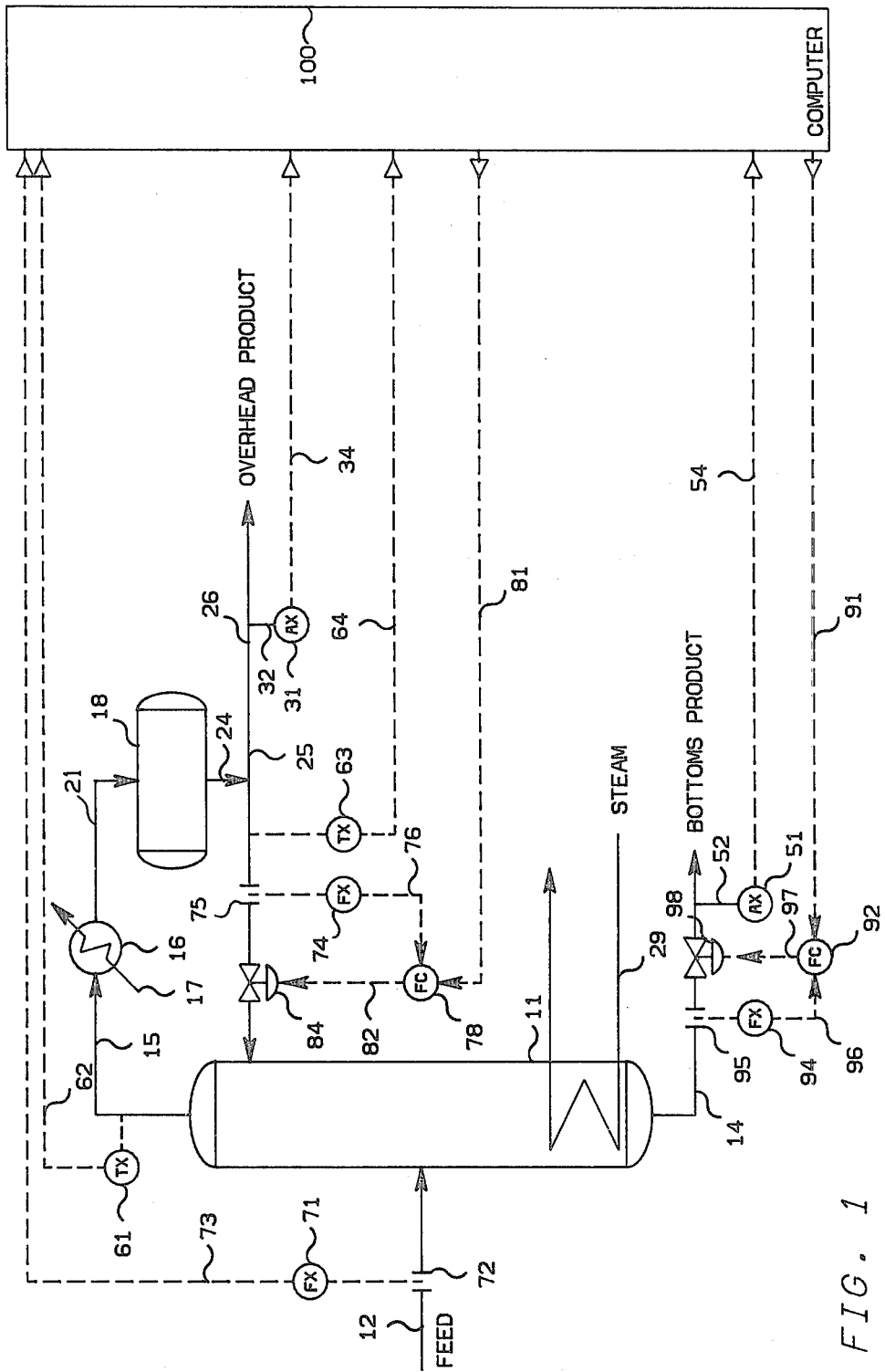

United States Patent [19]

Hobbs

[11] Patent Number: 4,473,443

[45] Date of Patent: Sep. 25, 1984

[54] CONTROL OF A FRACTIONAL DISTILLATION PROCESS

[75] Inventor: James W. Hobbs, Sweeny, Tex.

[73] Assignee: Phillips Petroleum Company, Bartlesville, Okla.

[21] Appl. No.: 360,304

[22] Filed: Mar. 22, 1982

[51] Int. Cl.³ .............................................. B01D 3/42
[52] U.S. Cl. .......................................... 203/2; 203/3; 202/160; 364/501
[58] Field of Search ....................................... 203/1-3, 203/DIG. 18; 202/160, 206; 196/132; 208/DIG. 1; 62/21, 37; 364/501

[56] References Cited

U.S. PATENT DOCUMENTS

| | | | |
|---|---|---|---|
| 3,018,230 | 1/1962 | Morgan | 203/3 |
| 3,156,628 | 11/1964 | Larrison | 203/3 |
| 3,308,040 | 3/1967 | Johnson et al. | 203/3 |
| 3,309,287 | 3/1967 | Lupfer et al. | 203/3 |
| 3,336,205 | 8/1967 | Rijnsdorp et al. | 203/3 |
| 3,361,646 | 1/1968 | MacMullen et al. | 203/3 |
| 3,428,528 | 2/1969 | Oglesby et al. | 203/1 |
| 3,449,215 | 6/1969 | Johnson et al. | 203/3 |
| 3,477,916 | 11/1969 | McNeill et al. | 203/3 |
| 3,755,087 | 8/1973 | Bajek et al. | 203/3 |
| 3,756,921 | 9/1973 | Bajek et al. | 196/132 |

*Primary Examiner*—Wilbur L. Bascomb, Jr.

*Attorney, Agent, or Firm*—French, Hughes and Doescher

[57] ABSTRACT

In a fractional distillation process in which first (light key) and second (heavy key) components contained in a feed stream are separated with the major portion of the light key component being removed in an overhead product stream and the major portion of the heavy key component being removed in a bottoms product stream, a signal which is responsive to the concentration of the light key component in the bottoms product stream is summed with a signal which is responsive to the concentration of the heavy key component in the overhead product stream to derive a signal which is utilized to manipulate the flow rate of the external reflux (sigma control). Also, the difference between a signal which is responsive to the concentration of the light key component in the bottoms product stream and a signal which is responsive to the concentration of the heavy key component in the overhead product stream is utilized to control the flow rate of the bottoms product stream (delta control). The sigma-delta control results in decoupling of the overhead product composition control and bottoms product composition control, improved recovery from disturbances and increased stability of the process.

28 Claims, 3 Drawing Figures

CONTROL OF A FRACTIONAL DISTILLATION PROCESS

This invention relates to control of a fractional distillation process. In one aspect, this invention relates to method and apparatus for manipulating the flow rate of the external reflux based on the summation of a signal, which is responsive to the concentration of a heavy key component in the overhead product stream, and a signal which is responsive to the concentration of a light key component in the bottoms product stream. In another aspect, this invention relates to method and apparatus for manipulating the flow rate of the bottoms product stream based on the difference between a signal, which is responsive to the concentration of a heavy key component in the overhead product stream, and a signal which is responsive to the concentration of a light key component in the bottoms product stream.

Fractional distillation columns are employed in many chemical manufacturing processes to make desired separations. Typically, a feed stream containing at least first (light key) and second (heavy key) components is supplied to the fractional distillation column. It is generally physically impossible to completely separate the light key component from the heavy key component and thus, while an overhead product stream removed from the fractional distillation column may contain a substantial portion of the light key component contained in the feed stream, the overhead product stream will also contain some concentration of the heavy key component. In like manner, a substantial portion of the heavy key component contained in the feed stream may be removed from the fractional distillation column in a bottoms product stream but the bottoms product stream will also contain some concentration of the light key component. Generally, a desired concentration of the heavy key component in the overhead product stream and of the light key component in the bottoms product stream will be known for any particular fractional distillation process. These desired concentrations are generally set so as to substantially maximize the profitability of the fractional distillation process while also maintaining desired product specifications.

Figure 3:
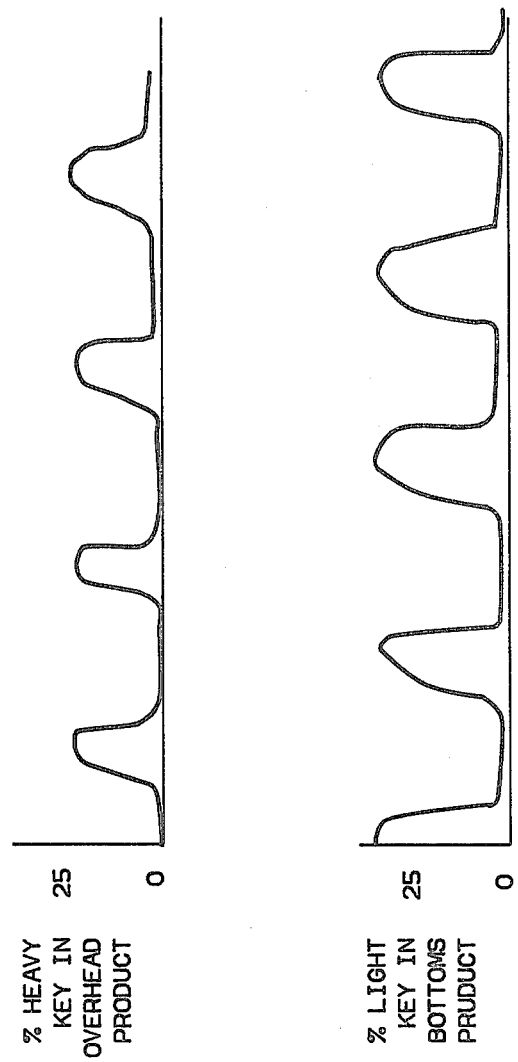

The concentration of the heavy key component in the overhead product stream can be controlled by manipulating the bottoms product flow rate in response to an analysis of the concentration of the heavy key component in the overhead product. In like manner, the concentration of the light key component in the bottoms product stream can be controlled by manipulating the flow rate of the external reflux in response to an analysis of the concentration of the light key component in the bottoms product stream. However, while such control is generally effective, after a severe disturbance such as a significant change in the feed flow rate to the fractional distillation column, the response to the fractional distillation column may be as illustrated in FIG. 3. Obviously, this type of response is totally undesirable and usually will require the operator putting the composition control on manual to regain composition control rather than depending upon the automatic control based on product analysis to regain composition control.

The sum of the two responses illustrated in FIG. 3 will be relatively constant. This would be especially true if weighting factors were applied to the two response illustrated in FIG. 3. It is thus an object of this invention to utilize a summation of a signal, which is responsive to the concentration of the heavy key component in the overhead product stream, and a signal which is responsive to the concentration of a light key component in the bottoms product stream, to manipulate the flow rate of the external reflux. Use of the summation provides a means by which the flow rate of the external reflux can be maintained substantially constant which is desirable.

The difference between the responses illustrated in FIG. 3 would generally take the form of a sine wave. Again, this would be especially true if weighting factors were applied to the responses illustrated in FIG. 3. Control based on a sine wave response is preferred over control based on the responses illustrated in FIG. 3 and thus it is an object of this invention to utilize the difference between a signal, which is responsive to the concentration of the heavy key component in the overhead product stream, and a signal, which is responsive to the concentration of the light key component in the bottoms product stream, to manipulate the flow rate of the bottoms product stream.

In accordance with the present invention, method and apparatus is provided whereby a signal which is responsive to the concentration of the light key component in the bottoms product stream is summed with a signal which is responsive to the concentration of the heavy key component in the overhead product stream to derive a signal which is utilized to manipulate the flow rate of the external reflux. This control based on a summation is generally referred to hereinafter as "sigma control". Also, in accordance with the present invention, method and apparatus is provided whereby the difference between a signal which is responsive to the concentration of the light key component in the bottoms product stream and a signal which is responsive to the concentration of the heavy key component in the overhead product stream is utilized to control the flow rate of the bottoms product stream. This control based on a difference is referred to hereinafter as "delta control". The sigma and delta control may be utilized individually if desired but are preferably used together to effect complete control of a fractional distillation process. The combination of sigma and delta control results in decoupling of the overhead product composition control and bottoms product composition control, improved recovery from disturbances and increased stability of the process.

Figure 2:
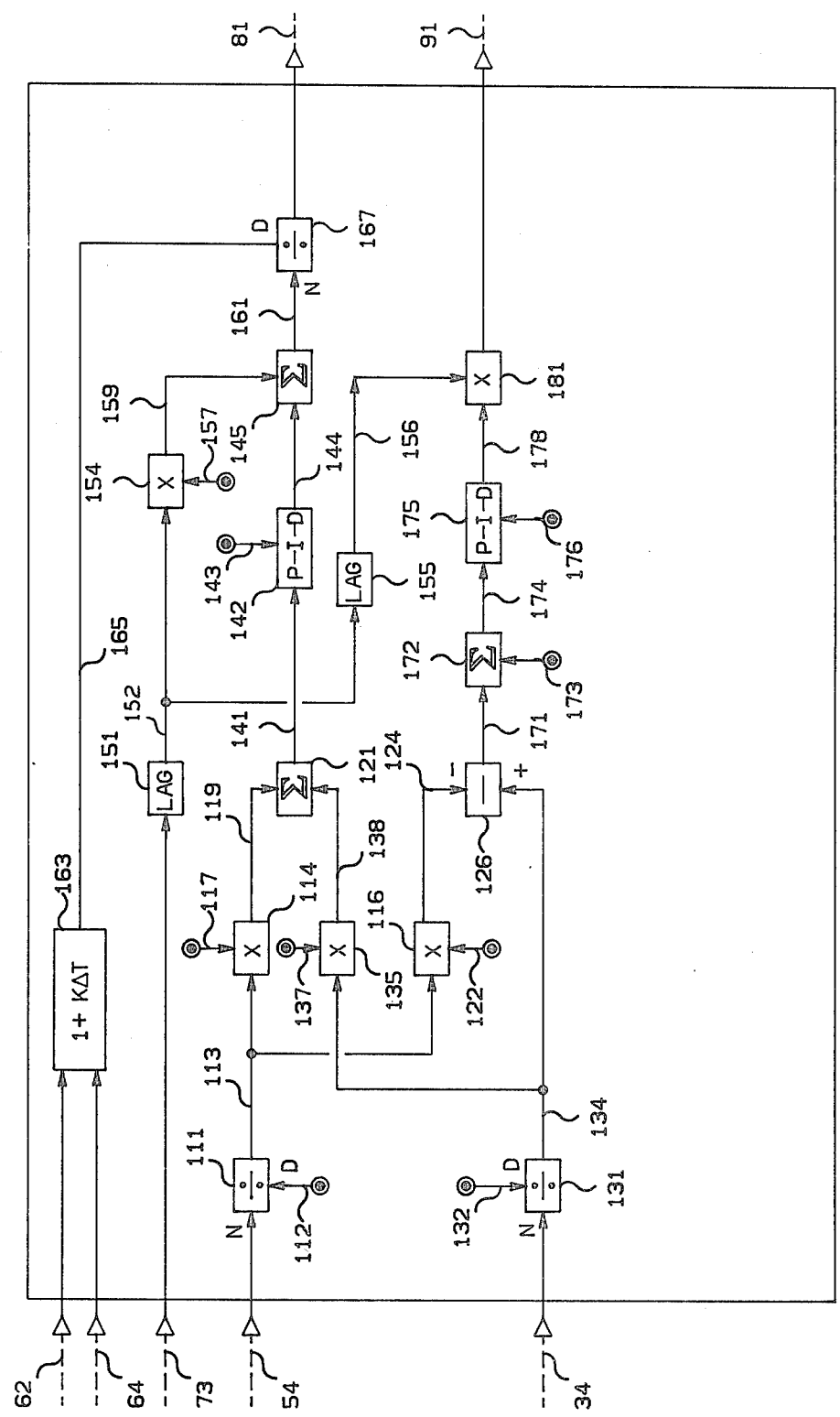

Other objects and advantages of the invention will be apparent from the foregoing brief description of the invention and the appended claims as well as from the detailed description of the drawings in which:

FIG. 1 is a diagrammatic illustration of a fractional distillation process with the associated control system of the present invention;

FIG. 2 is a representation of the computer logic suitable for calculation of the control signals illustrated in FIG. 1 based on the process measurements illustrated in FIG. 1; and FIG. 3 is a representation of the response of a fractional distillation process to a severe disturbance where control of the flow rate of the external reflux is based on an analysis of the concentration of the light key component in the bottoms product and control of the flow rate of the bottoms product is based on an analysis of the concentration of the heavy key component in the overhead product.

The invention is illustrated and described in terms of a specific fractional distillation process for the separation of isobutane from normal butane. However, the invention is applicable to any fractional distillation process in which it is desired to maintain a desired overhead product composition and bottoms product composition.

Also, the foregoing description of the invention and the background of the invention as well as the detailed description which follows are in terms of a light key component and a heavy key component because control is almost always based on these components. However, the invention is applicable to controlling the concentration of any component in either the bottoms product and the overhead product.

A specific control system configuration is set forth in FIG. 1 for the sake of illustration. However, the invention extends to different types of control system configurations which accomplish the purpose of the invention. Lines designated as signal lines in the drawings are electrical or pneumatic in this preferred embodiment. Generally, the signals provided from any transducer are electrical in form. However, the signals provided from flow sensors will generally be pneumatic in form. Transducing of these signals is not illustrated for the sake of simplicity because it is well known in the art that if a flow is measured in pneumatic form it must be transduced to electrical form if it is to be transmitted in electrical form by a flow transducer. Also, transducing of the signals from analog form to digital form or from digital form to analog form is not illustrated because such transducing is also well known in the art.

The invention is also applicable to mechanical, hydraulic or other signal means for transmitting information. In almost all control systems some combination of electrical, pneumatic, mechanical or hydraulic signals will be used. However, use of any other type of signal transmission, compatible with the process and equipment in use, is within the scope of the invention.

A digital computer is used in the preferred embodiment of this invention to calculate the required control signal based on measured process parameters as well as set points supplied to the computer. Analog computers or other types of computing devices could also be used in the invention. The digital computer is preferably an OPTROL 7000 Process Computer System from Applied Automation, Inc., Bartlesville, Okla.

Signal lines are also utilized to represent the results of calculations carried out in a digital computer and the term "signal" is utilized to refer to such results. Thus, the term signal is used not only to refer to electrical currents or pneumatic pressures but is also used to refer to binary representations of a calculated or measured value.

The controllers shown may utilize the various modes of control such as proportional, proportional-integral, proportional-derivative, or proportional-integral-derivative. In this preferred embodiment, proportional-integral-derivative controllers are utilized but any controller capable of accepting two input signals and producing a scaled output signal, representative of a comparison of the two input signals, is within the scope of the invention.

The scaling of an output signal by a controller is well known in control system art. Essentially, the output of a controller may be scaled to represent any desired factor or variable. An example of this is where a desired flow rate and an actual flow rate is compared by a controller. The output could be a signal representative of a desired change in the flow rate of some gas necessary to make the desired and actual flows equal. On the other hand, the same output signal could be scaled to represent a percentage or could be scaled to represent a temperature change required to make the desired and actual flows equal. If the controller output can range from 0 to 10 volts, which is typical, then the output signal could be scaled so that an output signal having a voltage level of 5.0 volts corresponds to 50 percent, some specified flow rate, or some specified temperature.

The various transducing means used to measure parameters which characterize the process and the various signals generated thereby may take a variety of forms or formats. For example, the control elements of the system can be implemented using electrical analog, digital electronic, pneumatic, hydraulic, mechanical or other similar types of equipment or combinations of one or more such equipment types. While the presently preferred embodiment of the invention preferably utilizes a combination of pneumatic final control elements in conjunction with electrical analog signal handling and translation apparatus, the apparatus and method of the invention can be implemented using a variety of specific equipment available to and understood by those skilled in the process control art. Likewise, the format of the various signals can be modified substantially in order to accommodate signal format requirements of the particular installation, safety factors, the physical characteristics of the measuring or control instruments and other similar factors. For example, a raw flow measurment signal produced by a differential pressure orifice flow meter would ordinarily exhibit a generally proportional relationship to the square of the actual flow rate. Other measuring instruments might produce a signal which is proportional to the measured parameter, and still other transducing means may produce a signal which bears a more complicated, but known, relationship to the measured parameter. Regardless of the signal format or the exact relationship of the signal to the parameter which it represents, each signal representative of a measured process parameter or representative of a desired process value will bear a relationship to the measured parameter or desired value which permits designation of a specific measured or desired value by a specific signal value. A signal which is representative of a process measurement or desired process value is therefore one from which the information regarding the measured or desired value can be readily retrieved regardless of the exact mathematical relationship between the signal units and the measured or desired process units.

Referring now to the drawings and in particular FIG. 1, there is illustrated a fractional distillation column 11. A feed stream consisting essentially of isobutane and normal butane is provided to the fractional distillation column 11 through conduit means 12. Normal butane (heavy key) is removed as a bottoms product through conduit means 14. Isobutane (light key) is removed in an overhead vapor stream from the fractional distillation column 11 through conduit means 15. It is again noted that, while the bottoms product stream will consist principally of normal butane, it will also contain some concentration of isobutane. In like manner, the overhead product will contain some concentration of normal butane.

The overhead stream flowing through conduit means 15 is provided from the fractional distillation clumn 11 through conduit means 15 to the heat exchanger 16. The heat exchanger 16 is provided with a cooling medium through conduit means 17. The at least partially condensed fluid stream from the heat exchanger 16 is provided to the overhead accumulator 18 through conduit means 21. A first portion of the liquid in the overhead accumulator 18 is provided through the combination of conduit means 24 and 25 as an external reflux to the fractional distillation column 11. A second portion of the liquid in the accumulator 18 is removed through the combination of conduit means 24 and 26 as the overhead product.

A heating fluid is provided to the fractional distillation column 11 through conduit means 29. This is a typical manner of supplying heat to a fractional distillation column but other methods could be utilized if desired.

The fractional distillation process for separating isobutane from normal butane described to this point is conventional. It is the manner in which sigma and delta control are applied to the fractional distillation process which provides the novel features of the present invention.

Analyzer transducer 31, which is preferably a Model 102 Process Chromatograph manufactured by Applied Automation, Inc., Bartlesville, Okla., is in fluid communication with conduit means 26 through conduit means 32. The analyzer transducer 31 provides an output signal 34 which is representative of the concentration of normal butane in the isobutane product flowing through conduit means 26. Signal 34 is provided from the analyzer transducer 31 as an input to computer 100.

Analyzer transducer 51, which is also preferably a Model 102 Process Chromatograph, is in fluid communication with conduit means 14 through conduit means 52. The analyzer transducer 51 provides an output signal 54 which is representative of the concentration of isobutane in the normal butane product flowing through conduit means 14. Again, by specifying the concentration of isobutane in the bottoms product stream, the purity of the bottoms product stream is specified. Signal 54 is provided from the analyzer transducer 51 as an input to computer 100.

Temperature transducer 61 in combination with a temperature measuring device such as a thermocouple, which is operably located in conduit means 15, provides an output signal 62 which is representative of the actual temperature of the overhead stream flowing through conduit means 15. Signal 62 is provided from temperature transducer 61 as an input to computer means 100. In like manner, temperature transducer 63 provides an output signal 64, which is representative of the actual temperature of the external reflux flowing through conduit means 25, to computer means 100.

Flow transducer 71 in combination with the flow sensor 72, which is operably located in conduit means 12, provides an output signal 73 which is representative of the flow rate of the feed stream flowing through conduit means 12. Signal 73 is provided from the flow transducer 71 as an input to computer 100.

In response to the described input signals, computer means 100 calculates a set point for the external reflux flow rate and a set point for the bottoms product flow rate. Signal 81, which is representative of the calculated set point for the external reflux flow rate, is provided as the set point signal to the flow controller 78. Flow transducer 74 in combination with flow sensor 75, which is operably located in conduit means 25, provides an output signal 76 which is representative of the actual flow rate of the external reflux flowing through conduit means 25. Signal 76 is provided as the process variable input to the flow controller 78. In response to signals 76 and 81, the flow controller 78 provides an output signal 82 which is responsive to the difference between signals 76 and 81. Signal 82 is scaled so as to be representative of the position of the control valve 84, which is operably located in conduit means 25, required to maintain the actual flow rate of the external reflux substantially equal to the desired flow rate as represented by signal 81. Signal 82 is provided as a control signal to the control valve 84.

Signal 91, which is representative of the calculated set point for the bottoms product flow rate, is provided as the set point signal to the flow controller 92. Flow transducer 94 in combination with the flow sensor 95, which is operably located in conduit means 14, provides an output signal 96 which is representative of the actual flow rate of the bottoms product stream flowing through conduit means 14. Signal 96 is provided from the flow transducer 94 as the process variable input to the flow controller 92. In response to signals 91 and 96, the flow controller 92 provides an output signal 97 which is responsive to the difference between signals 91 and 96. Signal 97 is scaled so as to be representative of the position of the control valve 98, which is operably located in conduit means 14, required to maintain the actual flow rate of the bottoms product stream substantially equal to the desired flow rate as represented by signal 91. Signal 97 is provided as a control signal to the control valve 98.

Referring now to FIG. 2, signal 54 which is representative of the concentration of isobutane in the bottoms product stream is provided to the numerator input of the dividing block 111. Signal 112, which is representative of the desired concentration of isobutane in the bottoms product stream, is provided to the denominator input of the dividing block 111. Signal 54 is divided by signal 112 to establish signal 113 which is representative of the actual concentration of isobutane divided by the desired concentration. Signal 113 is provided from the dividing block 111 as an input to the multiplying block 114 and as an input to the multiplying block 116.

Signal 117, which is representative of a weighting factor which will be discussed more fully hereinafter, is provided as a second input to the multiplying block 114. Signal 113 is multiplied by signal 117 to establish signal 119 which is provided from the multiplying block 114 as an input to the summing block 121. In like manner, signal 122, which is also representative of a weighting factor, is provided as an input to the multiplying block 116. Signal 113 is multiplied by signal 122 to establish signal 124 which is provided from the multiplying block 116 to the subtrahend input of the subtracting block 126.

Signal 34, which is representative of the concentration of normal butane in the overhead product, is provided to the numerator input of the dividing block 131. Signal 132, which is representative of the desired concentration of normal butane in the overhead product stream is provided to the denominator input of the dividing block 131. Signal 34 is divided by signal 132 to establish signal 134 which is representative of the actual concentration of normal butane in the overhead product divided by the desired concentration. Signal 134 is provided from the dividing block 131 as an input to the multiplying block 135 and to the minuend input of the subtracting block 126.

Signal 137, which is representative of one minus the magnitude of signal 117, is provided as a second input to the multiplying block 135. Signal 134 is multiplied by signal 137 to establish signal 138 which is provided from the multiplying block 135 as a second input to the summing block 121.

Division of the actual concentration by the desired concentration for both the overhead analysis and bottoms analysis is utilized to compensate for differences which may exist in the magnitude of the desired concentration of the normal butane in the overhead product stream and the isobutane in the bottoms product stream which are typically different. As an extreme examle for a different process, the desired concentration of the heavy key cmponent in the overhead product stream might be in parts per million while the desired concentration of the light key component in the bottoms product stream might be five percent. Division of the actual concentration by the desired concentration at least partially compensates for these differences but would not be required in those circumstances where the concentration of the heavy key component in the overhead product stream is essentially the same as the concentration of the light key component in the bottoms product stream.

In like manner, the weighting factors represented by signals 117, 137, and 122 are preferred to compensate for differences in the amplitude of the responses illustrated in FIG. 3. Essentially, the magnitude of signals 117 and 122 are chosen so as to make the amplitude of the responses illustrated in FIG. 3 substantially equal. Currently preferred values for the magnitude of signal 117 are in the range of about 0.2 to about 0.5. Currently preferred values for the magnitude of signal 122 are in the range of about 0.2 to about 1.0.

Signal 119 is summed with signal 138 to establish signal 141. Signal 141 is provided from the summing block 121 as the process variable input to the controller block 142. Signal 143, which is representative of 1.0, is provided as the set point input to the controller block 142. In response to signals 141 and 143, the controller block 142 establishes an output signal 144 which is responsive to the difference between signals 141 and 143. Signal 144 is provided from the controller block 142 as an input to the summing block 145. Essentially, signal 144 may be considered to be representative of a change in the flow rate of the internal reflux required to maintain the magnitude of signal 141 substantially equal to 1.0.

Signal 73, which is representative of the flow rate of the feed stream flowing through conduit means 12, is provided as an input to the lag block 151. The lag block 151 is an exponential lag the function of which is well known to those skilled in process control. Essentially, the lag 151 prevents a step change in the feed flow rate from being reflected directly through the process control system. A step change in the magnitude of signal 73 will cause an exponential change in the magnitude of signal 152. The time required for the magnitude of signal 152 to change to the new magnitude of signal 73 after a step change is known as the time constant of the lag 151. Essentially, the time constant is chosen to compensate for the difference between the time required for a change in the feed flow rate to affect the output of the analyzer 51 and the time required for a change in the reflux flow rate to affect the output of the analyzer 51. Signal 152 is provided from the lag 151 as an input to the multiplying block 154 and as an input to the lag block 155.

Signal 157, which is representative of the internal reflux flow rate to the feed flow rate ratio required to maintain a desired concentration of isobutane in the bottoms product stream, is provided as a second input to the multiplying block 154. The magnitude of signal 157 will generally be known for a particular fractional distillation process but, as will be more fully discussed hereinafter, it is not required that signal 157 be the exact internal reflux to feed flow rate ratio, Signal 152 is multiplied by signal 157 to establish signal 159 which is provided from the multiplying block 154 as a second input to the summing block 145.

Essentially, signal 159 may be considered a feed forward prediction of the flow rate of the internal reflux required to maintain a desired concentration of isobutane in the bottoms product stream. Signal 144 may be considered a feed back control signal since signal 144 is based on actual analysis. Thus, signal 159 provides a predictive control which attempts to compensate for changes in feed flow rate before those changes in feed flow rate can cause the production of off-specification product while signal 144 acts as a bias term to essentially correct the feed forward prediction represented by signal 159. Signals 144 and 159 are summed to establish signal 161 which is representative of the flow rate of the internal reflux required to maintain the actual concentration of isobutane in the bottoms product substantially equal to the desired concentration. Signal 161 is provided from the summing block 145 to the numerator input of the dividing block 167.

The desired external reflux flow rate is calculated by solving the known equation $$R=(1+K\Delta T)/R_i \qquad (1)$$

where
R is the external reflux flow rate,
$R_i$ is the internal reflux flow rate,
$\Delta T$ is the difference between the temperatures of the overhead stream and the external reflux, and
K is equal to the specific heat of the external reflux divided by the heat of vaporization for the external reflux.

This equation is developed in Computer Control of Distillation Reflux, ISA Journal, June, 1959, pages 34–39 by D. E. Lupfer and D. E. Berger.

Signals 62 and 64, which are representative of the temperature of the overhead stream and external reflux respectively, are provided as inputs to block 163. Block 163 is utilized to calculate the magnitude of the term $1+K\Delta T$ which is required for the solution of Equation 1. The constant K can be easily calculated and, for the particular fractional distillation process to which the present control invention was applied, the constant K was equal to 0.004. Thus, signals 62 and 64 and the value of the constant K can be utilized to establish signal 165 which is representative of $1+K\Delta T$. Signal 165 is provided from block 163 to the denominator input of the dividing block 167. Signal 161 is divided by signal 165 to solve Equation 1 and thus establish signal 81 which is provided as an output from computer 100 and which is utilized as has been previously been described.

Signal 124 is subtracted from signal 134 to establish signal 171. Signal 171 is provided from the subtracting block 126 as an input to the summing block 172. Signal 173, which has a magnitude equal to that of signal 122, is provided as a second input to the summing block 172. Signals 171 and 173 are summed to establish signal 174. Signal 174 is provided from the summing block 172 as the process variable input to the controller block 175.

Signal 176, which is representative of 1.0, is provided as the set point input to the controller block 175. In response to signals 174 and 176, the controller block 175 provides an output signal 178 which is responsive to the difference between signals 174 and 176. Signal 178 is provided from the controller block 175 as an input to the multiplying block 181. Essentially, signal 178 is representative of the amount of the feed flowing through conduit means 12 which should be removed as a bottoms product stream in order to maintain a desired concentration of normal butane in the overhead product stream.

The lag block 155 is also an exponential lag. The time constant for the lag 155 when taken in conjunction with the time constant for the lag 151 is chosen so as to compensate for the difference between the time required for change in the feed flow rate to effect the output of the analyzer 31 and the time required for a change in the bottoms flow rate to effect the output of the analyzer 31. Signal 152 is passed through the lag block 155 to establish signal 156 which is provided as a second input to the multiplying block 181. Signal 178 is multiplied by signal 156 to establish signal 91 which is provided as an output from the computer 100 and which is utilized as has been previously described.

As an example of the operation of the control logic illustrated in FIG. 2, consider a situation in which the actual concentration of the isobutane in the bottoms product stream is equal to the desired concentration of isobutane in the bottoms product stream and the desired concentration of normal butane in the overhead product stream is equal to the desired concentration of normal butane in the bottoms product stream. In other words, the fractional distillation column is being controlled perfectly with respect to product compositions. Also, as an example, the weighting factor represented by signal 117 will be chosen to be 0.2 and the weighting factor represented by signal 122 will be chosen to be 0.5. For the assumed conditions, signal 113 will be representative of 1, signal 119 will be representative of 0.2, signal 138 will be representative of 0.8 and signal 141 will be representative of 1. Since signal 141 is representative of 1, the magnitude of signal 144 may be substantially zero since the feed forward portion of the control system is maintaining the desired control. However, when the actual concentration of isobutane in the bottoms product does not equal the desired concentration, it can be seen that the magnitude of signal 141 will not be 1 and signal 144 will have some magnitude.

Again, for the described conditions, signal 134 will be representative of 1 and signal 124 will be representative of 0.5. Thus, signal 171 will be representative of 0.5 and signal 174 will be representative of 1. Under these conditions, the tuning constants for the controller block 175 are chosen so that signal 178 will have a magnitude even when signal 174 is equal to signal 176. If the magnitude of signal 174 changes, which will occur if the concentration of normal butane in the overhead product stream does not equal the desired concentration, then the magnitude of signal 178 will change which will cause a change in the desired flow rate of the bottoms product stream.

The invention has been described in terms of a preferred embodiment as illustrated in FIGS. 1-3. Specific components used in the practice of the invention as illustrated in FIG. 1 such as flow sensors 43, 72 and 95; flow transducers 42, 71 and 94; flow controllers 92 and 78; temperature transducers 61 and 63; and control valves 98 and 84 are each well known, commercially available control components such as are described at length in Perry's *Chemical Engineer's Handbook*, 4th Edition, Chapter 22, McGraw-Hill.

For reasons of brevity, conventional auxilliary fractionation equipment such as pumps, heat exchangers, additional measurement-control devices, etc. have not been included in the above description as they play no part in the explanation of the invention.

While the invention has been described in terms of the presently preferred embodiment, reasonable variations and modifications are possible by those skilled in the art and such variations and modifications are within the scope of the described invention and the appended claims.

That which is claimed is:

1. Apparatus comprising:
   a fractional distillation column;
   means for passing a feed mixture containing at least first and second components into said fractional distillation column;
   means for withdrawing an overhead vapor stream, having a substantially increased concentration of said first component with respect to the concentration of said first component in said feed mixture, from an upper portion of said fractional distillation column means;
   means for condensing at least a portion of said overhead vapor stream;
   an accumulator;
   means for passing the resulting at least partially condensed overhead stream into said accumulator;
   means for withdrawing condensate from said accumulator and for passing a first portion of the thus withdrawn condensate into an upper portion of said fractional distillation column as an external reflux stream therefor and for passing a second portion of the thus withdrawn condensate as an overhead product stream;
   means for withdrawing a bottoms product stream, having a substantially increased concentration of said second component with respect to the concentration of said second component in said feed mixture, from a lower portion of said fractional distillation column;
   means for establishing a first signal which is responsive to the concentration of said first component in said bottoms product stream;
   means for establishing a second signal which is responsive to the concentration of said second component in said overhead product stream;
   means for establishing a third signal which is responsive to the sum of said first signal and said second signal; and
   means for manipulating the flow rate of said external reflux stream in response to said third signal.

2. Apparatus in accordance with claim 1 wherein said means for establishing said first signal comprises:
   means for establishing a fourth signal representative of the actual concentration of said first component in said bottoms product stream;
   means for establishing a fifth signal representative of the desired concentration of said first component in said bottoms product stream;
   means for dividing said fourth signal by said fifth signal to establish a sixth signal; and
   means for multiplying said sixth signal by a weighting factor to establish said first signal.

3. Apparatus in accordance with claim 2 wherein said means for establishing said second signal comprises:
   means for establishing a seventh signal representative of the actual concentration of said second component in said overhead product stream;
   means for establishing an eighth signal representative of the desired concentration of said second component in said overhead product stream;
   means for dividing said seventh signal by said eighth signal to establish a ninth signal; and
   means for multiplying said ninth signal by 1.0 minus the magnitude of said weighting factor to establish said second signal.

4. Apparatus in accordance with claim 3 wherein said means for manipulating the flow rate of said external reflux stream in response to said third signal comprises:
   means for establishing a tenth signal which is representative of a prediction of the flow rate of the internal reflux in said fractional distillation column required to maintain the actual concentration of said first component in said bottoms product stream substantially equal to the desired concentration represented by said fifth signal;
   means for establishing an eleventh signal representative of 1.0;
   means for comparing said eleventh signal and said third signal and for establishing a twelfth signal which is responsive to the difference between said eleventh signal and said third signal, wherein said twelfth signal is scaled so as to be representative of any change in the flow rate of the internal reflux represented by said tenth signal required to maintain the actual concentration of said first component in said bottoms product stream substantially equal to the desired concentration represented by said fifth signal;
   means for summing said tenth signal and said twelfty signal to establish a thirteenth signal which is representative of the desired flow rate of the internal reflux in said fractional distillation column;
   means for establishing a fourteenth signal which is representative of the desired flow rate of said external reflux stream in response to said thirteenth signal; and
   means for manipulating the flow rate of said external reflux stream in response to said fourteenth signal.

5. Apparatus in accordance with claim 4 wherein said means for establishing said tenth signal comprises:
   means for establishing a fifteenth signal representative of the flow rate of said feed mixture to said fractional distillation column; and
   means for multiplying said fifteenth signal by a sixteenth signal, which is representative of a prediction of the ratio of the internal reflux flow rate in the fractional distillation column to the flow rate of the feed mixture required to maintain the actual concentration of said first component in said bottoms product stream substantially equal to the desired concentration represented by said fifth signal, to establish said tenth signal.

6. Apparatus in accordance with claim 4 wherein said means for establishing said fourteenth signal comprises:
   means for establishing a fifteenth signal representative of the actual temperature of said overhead vapor stream ($T_1$);
   means for establishing a sixteenth signal representative of the actual temperature of said external reflux ($T_2$);
   means for establishing a seventeenth signal representative of the specific heat of the said external reflux divided by the heat of vaporization for said external reflux (K);
   means for establishing an eighteenth signal representative of $1 + K (T_1 - T_2)$ in response to said fifteenth, sixteenth and seventeenth signals; and
   means for dividing said thirteenth signal by said eighteenth signal to establish said fourteenth signal.

7. Apparatus in accordance with claim 1 additionally comprising:
   means for establishing a fourth signal which is responsive to the concentration of said first component in said bottoms product stream;
   means for establishing a fifth signal which is responsive to the concentration of said second component in said overhead product stream; and
   means for establishing a sixth signal which is responsive to the difference between said fourth signal and said fifth signal; and
   means for manipulating the flow rate of said bottoms product stream in response to said sixth signal.

8. Apparatus in accordance with claim 7 wherein said means for establishing said fourth signal comprises:
   means for establishing a seventh signal representative of the actual concentration of said first component in said bottoms product stream;
   means for establishing an eighth signal representative of the desired concentration of said first component in said bottoms product stream;
   means for dividing said seventh signal by said eighth signal to establish a ninth signal; and
   means for multiplying said ninth signal by a weighting factor to establish said fourth signal.

9. Apparatus in accordance with claim 8 wherein said means for establishing said fifth signal comprises:
   means for establishing a tenth signal representative of the actual concentration of said second component in said overhead product stream;
   means for establishing an eleventh signal representative of the desired concentration of said second component in said overhead product stream; and
   means for dividing said tenth signal by said eleventh signal to establish said fifth signal.

10. Apparatus in accordance with claim 9 wherein said means for manipulating the flow rate of said bottoms product stream in response to said sixth signal comprises:
    means for adding said weighting factor to said sixth signal to establish a twelfth signal.
    means for establishing a thirteenth signal representative of 1.0;
    means for comparing said twelfth signal and said thirteenth signal and for establishing a fourteenth signal which is responsive to the difference between said twelfth signal and said thirteenth signal, wherein said fourteenth signal is scaled so as to be representative of the percentage of said feed mixture which should be removed from said fractional distillation column as said bottoms product stream in order to maintain the actual concentration of said second component in said overhead product stream substantially equal to the desired concentration represented by said eleventh signal;
    means for establishing a fifteenth signal representative of the flow rate of said feed mixture to said fractional distillation column;

means for multiplying said fourteenth signal and said fifteenth signal to establish a sixteenth signal which is representative of the desired flow rate of said bottoms product stream; and means for manipulating the flow rate of said bottoms product in response to said sixteenth signal.

11. Apparatus comprising:

a fractional distillation column;

means for passing a feed mixture containing at least first and second components into said fractional distillation column;

means for withdrawing an overhead vapor stream, having a substantially increased concentration of said first component with respect to the concentration of said first component in said feed mixture, from an upper portion of said fractional distillation column means;

means for condensing at least a portion of said overhead vapor stream;

an accumulator;

means for passing the resulting at least partially condensed overhead stream into said accumulator;

means for withdrawing condensate from said accumulator and for passing a first portion of the thus withdrawn condensate into an upper portion of said fractional distillation column as an external reflux stream therefor and for passing a second portion of the thus withdrawn condensate as an overhead product stream;

means for withdrawing a bottoms product stream, having a substantially increased concentration of said second component with respect to the concentration of said second component in said feed mixture, from a lower portion of said fractional distillation column;

means for establishing a first signal which is responsive to the concentration of said first component in said bottoms product stream;

means for establishing a second signal which is responsive to the concentration of said second component in said overhead product stream; and means for establishing a third signal which is responsive to the difference between said first signal and said second signal; and means for manipulating the flow rate of said bottoms product stream in response to said third signal.

12. Apparatus in accordance with claim 11 wherein said means for establishing said first signal comprises:

means for establishing a fourth signal representative of the actual concentration of said first component in said bottoms product stream;

means for establishing a fifth signal representative of the desired concentration of said first component in said bottoms product stream;

means for dividing said fourth signal by said fifth signal to establish a sixth signal; and means for multiplying said sixth signal by a weighting factor to establish said fourth signal.

13. Apparatus in accordance with claim 12 wherein said means for establishing said second signal comprises:

means for establishing a seventh signal representative of the actual concentration of said second component in said overhead product stream;

means for establishing an eight signal representative of the desired concentration of said second component in said overhead product stream; and means for dividing said seventh signal by said eighth signal to establish said second signal.

14. Apparatus in accordance with claim 13 wherein said means for manipulating the flow rate of said bottoms product stream in response to said third signal comprises:

means for adding said weighting factor to said third signal to establish a ninth signal.

means for establishing a tenth signal representative of 1.0;

means for comparing said ninth signal and said tenth signal and for establishing an eleventh signal which is responsive to the difference between said ninth signal and said tenth signal, wherein said fourteenth signal is scaled so as to be representative of the percentage of said feed mixture which should be removed from said fractional distillation column as said bottoms product stream in order to maintain the actual concentration of said second component in said overhead product stream substantially equal to the desired concentration represented by said eight signal;

means for establishing a twelfth signal representative of the flow rate of said feed mixture to said fractional distillation column;

means for multiplying said eleventh signal and said twelfth signal to establish a thirteenth signal which is representative of the desired flow rate of said bottoms product stream; and means for manipulating the flow rate of said bottoms product in response to said thirteenth signal.

15. A method for controlling a fractional distillation process utilized to separate first and second components contained in a feed stream flowing to a fractional distillation column, wherein said first component is principally removed from said fractional distillation column as an overhead vapor stream, wherein said overhead vapor stream is at least partially condensed with a first portion of the condensate being returned to an upper portion of said fractional distillation column as an external reflux stream and a second portion of said condensate being removed from said fractional distillation process as an overhead product, and wherein said second component is principally removed from said fractional distillation column as a bottoms product, said method comprising the steps of:

establishing a first signal which is responsive to the concentration of said first component in said bottoms product stream;

establishing a second signal which is responsive to the concentration of said second component in said overhead product stream;

establishing a third signal which is responsive to the sum of said first signal and said second signal; and manipulating the flow rate of said external reflux stream in response to said third signal.

16. A method in accordance with claim 15 wherein said step of establishing said first signal comprises:

establishing a fourth signal representative of the actual concentration of said first component in said bottoms product stream;

establishing a fifth signal representative of the desired concentration of said first component in said bottoms product stream;

dividing said fourth signal by said fifth signal to establish a sixth signal; and multiplying said sixth signal by a weighting factor to establish said first signal;

17. A method accordance with claim 16 wherein said step of establishing a seventh signal representative of the actual concentration of said second component in said overhead product stream;

establishing an eighth signal representative of the desired concentration of said second component in said overhead product stream;

dividing said seventh signal by said eighth signal to establish a ninth signal; and multiplying said ninth signal by 1.0 minus the magnitude of said weighting factor to establish said second signal.

18. A method in accordance with claim 17 wherein said step of manipulating the flow rate of said external reflux stream in response to said third signal comprises:

establishing a tenth signal which is representative of a prediction of the flow rate of the internal reflux in said fractional distillation column required to maintain the actual concentration of said first component in said bottoms product stream substantially equal to the desired concentration represented by said fifth signal;

establishing an eleventh signal representative of 1.0;

comparing said eleventh signal and said third signal and establishing a twelfth signal which is responsive to the difference between said eleventh signal and said third signal, wherein said twelfth signal is scaled so as to be representative of any change in the flow rate of the internal reflux represented by said tenth signal required to maintain the actual concentration of said first component in said bottoms product stream substantially equal to the desired concentration represented by said fifth signal;

summing said tenth signal and said twelfth signal to establish a thirteenth signal which is representative of the desired flow rate of the internal reflux in said fractional distillation column;

establishing a fourteenth signal which is representative of the desired flow rate of said external reflux stream in response to said thirteenth signal; and manipulating the flow rate of said external reflux stream in response to said fourteenth signal.

19. A method in accordance with claim 18 wherein said step of establishing said tenth signal comprises:

establishing a fifteenth signal representative of the flow rate of said feed mixture to said fractional distillation column; and multiplying said fifteenth signal by a sixteenth signal, which is representative of a prediction of the ratio of the internal reflux flow rate in the fractional distillation column to the flow rate of the feed mixture required to maintain the actual concentration of said first component in said bottoms product stream substantially equal to the desired concentration represented by said fifth signal, to establish said tenth signal.

20. A method in accordance with claim 19 wherein said step of establishing said fourteenth signal comprises:

establishing a fifteenth signal representative of the actual temperature of said overhead vapor stream ($T_1$);

establishing a sixteenth signal representative of the actual temperature of said external reflux ($T_2$);

establishing a seventeenth signal representative of the specific heat of the said external reflux divided by the heat of vaporization for said external reflux (K);

establishing an eighteenth signal representative of $1+K(T_1-T_2)$ in response to said fifteenth, sixteenth and seventeenth signals; and dividing said thirteenth signal by said eighteenth signal to establish said fourteenth signal.

21. A method in accordance with claim 15 additionally comprising the steps of:

establishing a fourth signal which is responsive to the concentration of said first component in said bottoms product stream;

establishing a fifth signal which is responsive to the concentration of said second component in said overhead product stream; and establishing a sixth signal which is responsive to the difference between said fourth signal and said fifth signal; and manipulating the flow rate of said bottoms product stream in response to said sixth signal.

22. A method in accordance with claim 21 wherein said step of establishing said fourth signal comprises:

establishing a seventh signal representative of the actual concentration of said first component in said bottoms product stream;

establishing an eighth signal representative of the desired concentration of said first component in said bottoms product stream;

dividing said seventh signal by said eighth signal to establish a ninth signal; and multiplying said ninth signal by a weighting factor to establish said fourth signal.

23. A method in accordance with claim 22 wherein said step of establishing said fifth signal comprises:

establishing a tenth signal representative of the actual concentration of said second component in said overhead product stream;

establishing an eleventh signal representative of the desired concentration of said second component in said overhead product stream; and dividing said tenth signal by said eleventh signal to establish said fifth signal.

24. A method in accordance with claim 23 wherein said step of manipulating the flow rate of said bottoms product stream in response to said sixth signal comprises:

adding said weighting factor to said sixth signal to establish a twelfth signal.

establishing a thirteenth signal representative of 1.0;

comparing said twelfth signal and a said thirteenth signal and establishing a fourteenth signal which is responsive to the difference between said twelfth signal and said thirteenth signal, wherein said fourteenth signal is scaled so as to be representative of the percentage of said feed mixture which should be removed from said fractional distillation column as said bottoms product stream in order to maintain the actual concentration of said second component in said overhead product stream substantially equal to the desired concentration represented by said eighth signal;

establishing a fifteenth signal representative of the flow rate of said feed mixture to said fractional distillation column;

multiplying said fourteenth signal and said fifteenth signal to establish a sixteenth signal which is representative of the desired flow rate of said bottoms product stream; and manipulating the flow rate of said bottoms product in response to said sixteenth signal.

25. A method for controlling a fractional distillation process utilized to separate first and second components contained in a feed stream flowing to a fractional distillation column, wherein said first component is principally removed from said frictional distillation column as an overhead vapor stream, wherein said overhead vapor stream is at least partially condensed with a first portion of the condensate being returned to an upper portion of said fractional distillation column as an external reflux stream and a second portion of said condensate being removed from said fractional distillation process as an overhead product, and wherein said second component is principally removed from said fractional distillation column as a bottoms product, said method comprising the steps of:

establishing a first signal which is responsive to the concentration of said first component in said bottoms product stream;

establishing a second signal which is responsive to the concentration of said second component in said overhead product stream; and establishing a third signal which is responsive to the difference between said first signal and said second signal; and manipulating the flow rate of said bottoms product stream in response to said third signal.

26. A method in accordance with claim 25 wherein said step of establishing said second signal comprises:

establishing a fourth signal representative of the actual concentration of said first component in said bottoms product stream;

establishing a fifth signal representative of the desired concentration of said first component in said bottoms product stream;

dividing said fourth signal by said fifth signal to establish a sixth signal; and multiplying said fourth signal by a weighting factor to establish said sixth signal.

27. A method in accordance with claim 26 wherein said step of establishing said second signal comprises:

establishing a seventh signal representative of the actual concentration of said second component in said overhead product stream;

establishing an eighth signal representative of the desired concentration of said second component in said overhead product steam; and dividing said seventh signal by said eighth signal to establish said second signal.

28. A method in accordance with claim 27 wherein said step of manipulating the flow rate of said bottoms product stream in response to said third signal comprises:

adding said weighting factor to said third signal to establish a ninth signal.

establishing a tenth signal representative of 1.0;

comparing said ninth signal and said tenth signal and establishing an eleventh signal which is responsive to the difference between said ninth signal and said tenth signal, wherein said eleventh signal is scaled so as to be representative of the percentage of said feed mixture which should be removed from said fractional distillation column as said bottoms product stream in order to maintain the actual concentration of said second component in said bottoms product stream substantially equal to the desired concentration represented by said eighth signal;

establishing a twelfth signal representative of the flow rate of said feed mixture to said fractional distillation column;

multiplying said eleventh signal and said twelfth signal to establish a thirteenth signal which is representative of the desired flow rate of said bottoms product stream; and manipulating the flow rate of said bottoms product in response to said thirteenth signal.

* * * * *

UNITED STATES PATENT AND TRADEMARK OFFICE
CERTIFICATE OF CORRECTION

PATENT NO. : 4,473,443

DATED : September 25, 1984

INVENTOR(S) : James W. Hobbs

It is certified that error appears in the above-identified patent and that said Letters Patent is hereby corrected as shown below:

Claim 4, column 11, line 37, "twelfty" should be --- twelfth ---.
Claim 14, column 14, line 20, "eight" should be --- eighth ---.
Claim 16, column 14, last line, ";" should be --- . ---.
Claim 17, column 14, line 2, after "establishing" insert ---said second signal comprises: ---. Begin a new paragraph with --- establishing ---.

Claim 25, column 17, line 2, "frictional" should be --- fractional ---.

Signed and Sealed this

Twenty-third Day of July 1985

[SEAL]

Attest:

DONALD J. QUIGG

Attesting Officer

Acting Commissioner of Patents and Trademarks